April 9, 1935.  S. L. VAN METER, JR  1,996,843
BATTERY FILLING DEVICE
Filed Oct. 7, 1933  4 Sheets-Sheet 1

Inventor
SOLOMON LEE VAN METER JR.
By
Attorney

April 9, 1935.  S. L. VAN METER, JR  1,996,843
BATTERY FILLING DEVICE
Filed Oct. 7, 1933  4 Sheets-Sheet 2
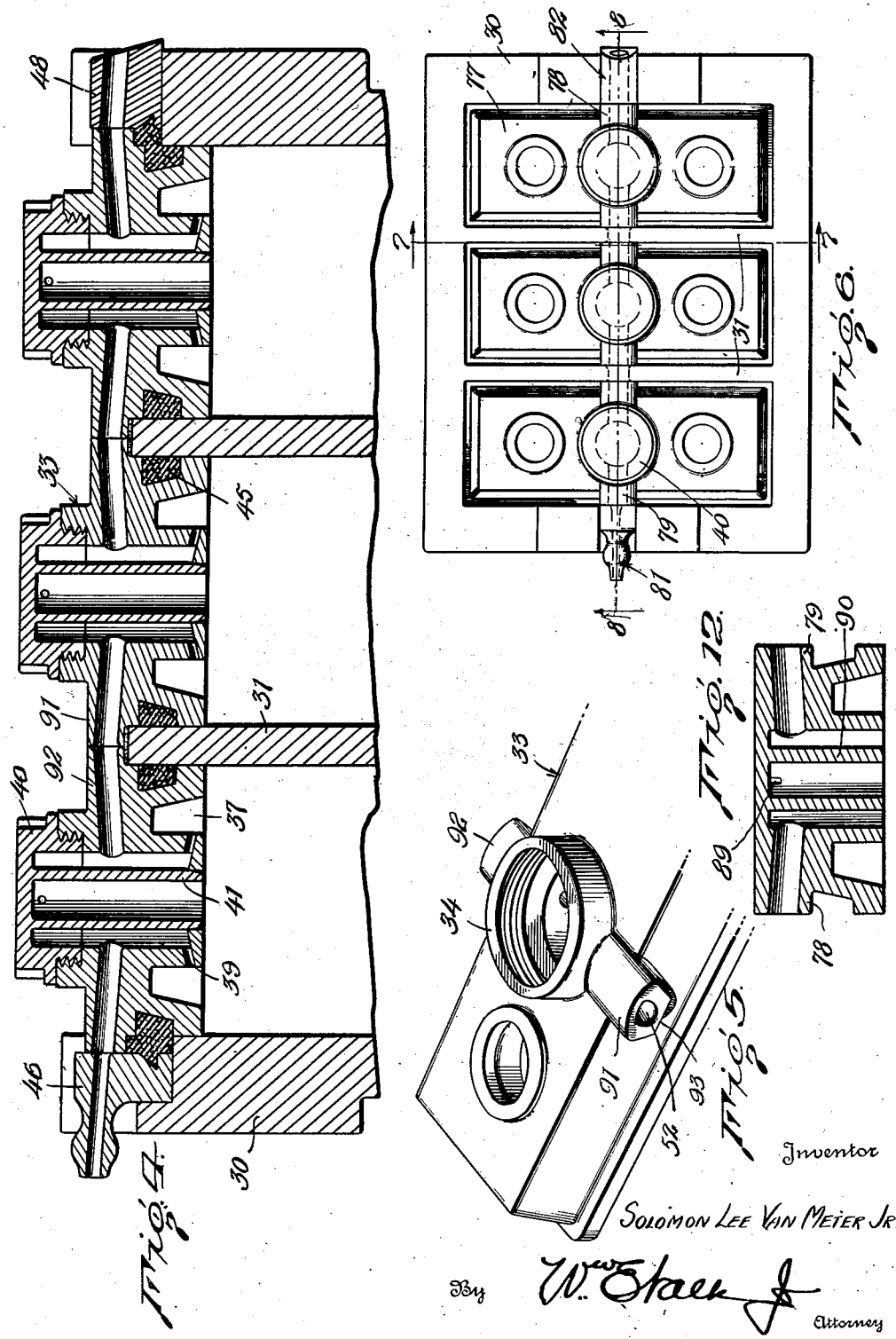
Inventor
Solomon Lee Van Meter Jr.
By W. Stack Jr.
Attorney

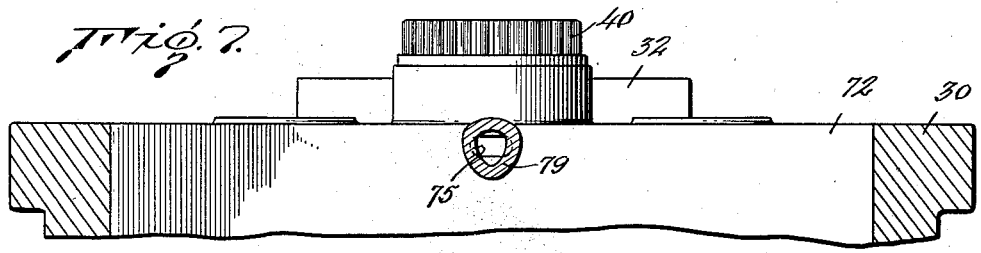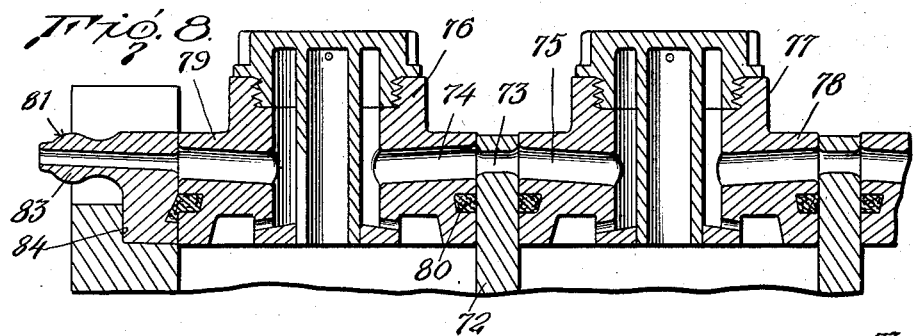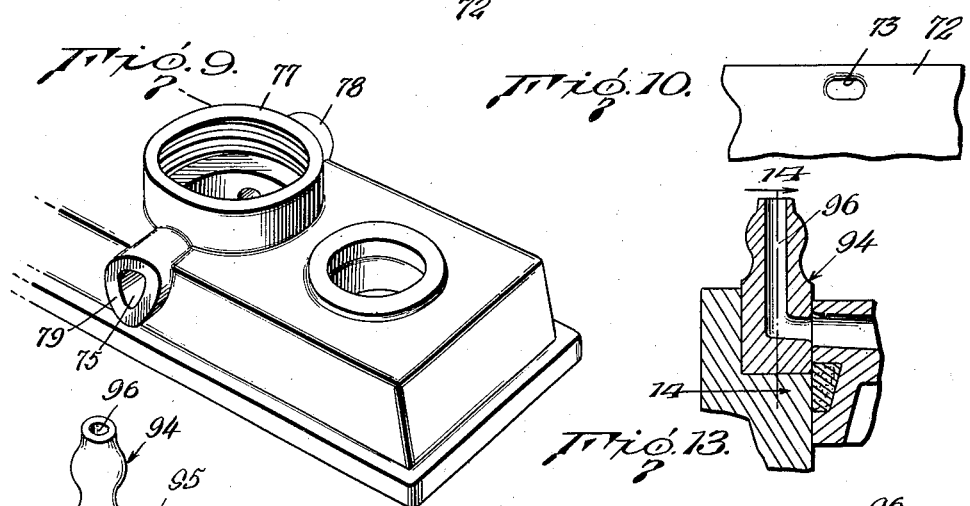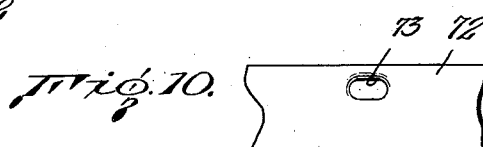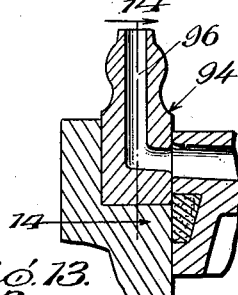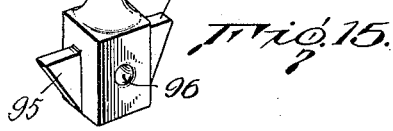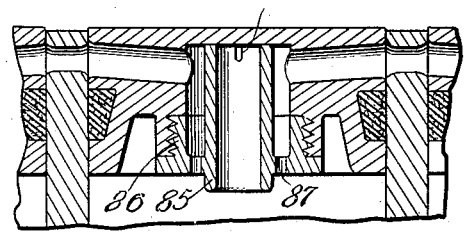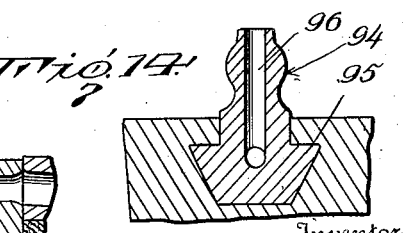

April 9, 1935.  S. L. VAN METER, JR  1,996,843
BATTERY FILLING DEVICE
Filed Oct. 7, 1933  4 Sheets-Sheet 4
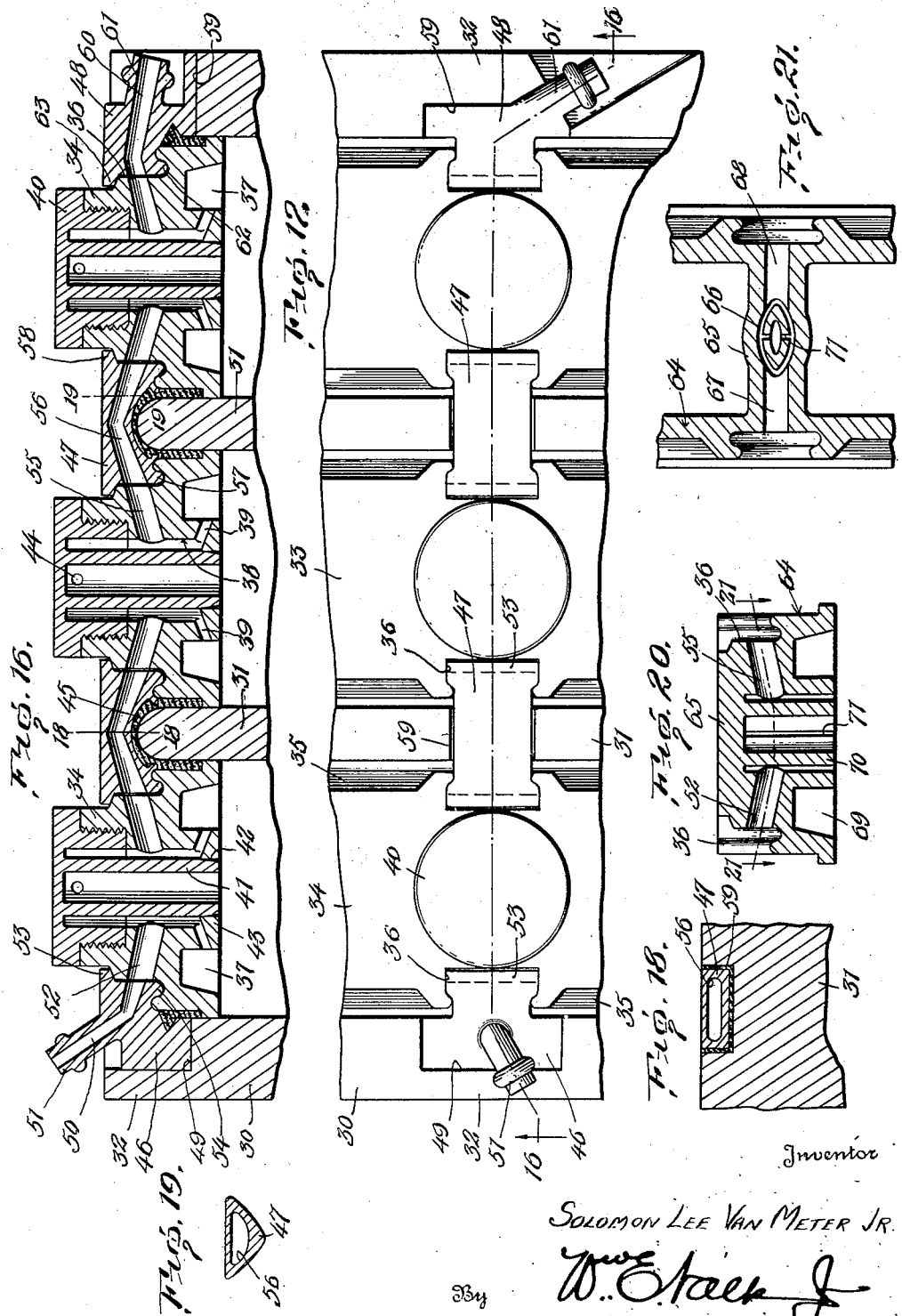
Inventor
SOLOMON LEE VAN METER JR.
By
Attorney Patented Apr. 9, 1935

1,996,843

UNITED STATES PATENT OFFICE 1,996,843

BATTERY FILLING DEVICE

Solomon L. Van Meter, Jr., Lexington, Ky.

Application October 7, 1933, Serial No. 692,639

15 Claims. (Cl. 136—162)

My invention relates to storage batteries, and is concerned more particularly with battery filling devices.

U. S. Patent No. 1,791,152, dated February 3, 1931, No. 1,837,242, dated December 22, 1931, and No. 1,848,035, dated March 1, 1932, are directed to generally similar subject matter. Said patents (issued in my name) describe and illustrate various forms of filling devices by which storage batteries may be reliably and economically serviced.

The objects of the present invention are generally similar to the stated objects of said patents. Structurally, however, the present invention and the inventions previously described, are quite dissimilar. Through the use of a filling device such as that now proposed, a thoroughly reliable and less costly installation is made possible. As the description proceeds, the advantages of the present concept will be more fully pointed out.

In the drawings:

Fig. 4 is a similar view on the line 4—4 of Fig. 1;

Fig. 5 is a perspective view of a portion of said device;

Fig. 6 is a view similar to Fig. 1 showing a different form of filling device;

Fig. 7 is an enlarged section on the line 7—7 of Fig. 6;

Fig. 8 is an enlarged section partly broken away, on the line 8—8 of Fig. 6;

Fig. 9 is a perspective view of a portion of said last mentioned device;

Fig. 10 is a fragmentary view showing a portion of one of the dividing partitions illustrated in Fig. 8;

Fig. 11 is a sectional view of a modified form of filling device;

Fig. 12 is a similar view of a further modification;

Fig. 13 is a fragmentary sectional view of a modified form of filler fitting;

Fig. 14 is a section on the line 14—14 of Fig. 13;

Fig. 15 is a perspective view of the filler fitting of Fig. 13;

Fig. 16 is an enlarged sectional view, similar to Fig. 4, showing what I now consider to be the preferred form of filling device;

Fig. 17 is a plan view, partly broken away, of a storage battery having associated with it that form of device illustrated in Fig. 16;

Fig. 18 is a section on the line 18—18 of Fig. 16;

Fig. 19 is a section on the line 19—19 of Fig. 16;

Fig. 20 is a section of a still further modification; and

Fig. 21 is a section on the line 21—21 of Fig. 20.

Figure 1:
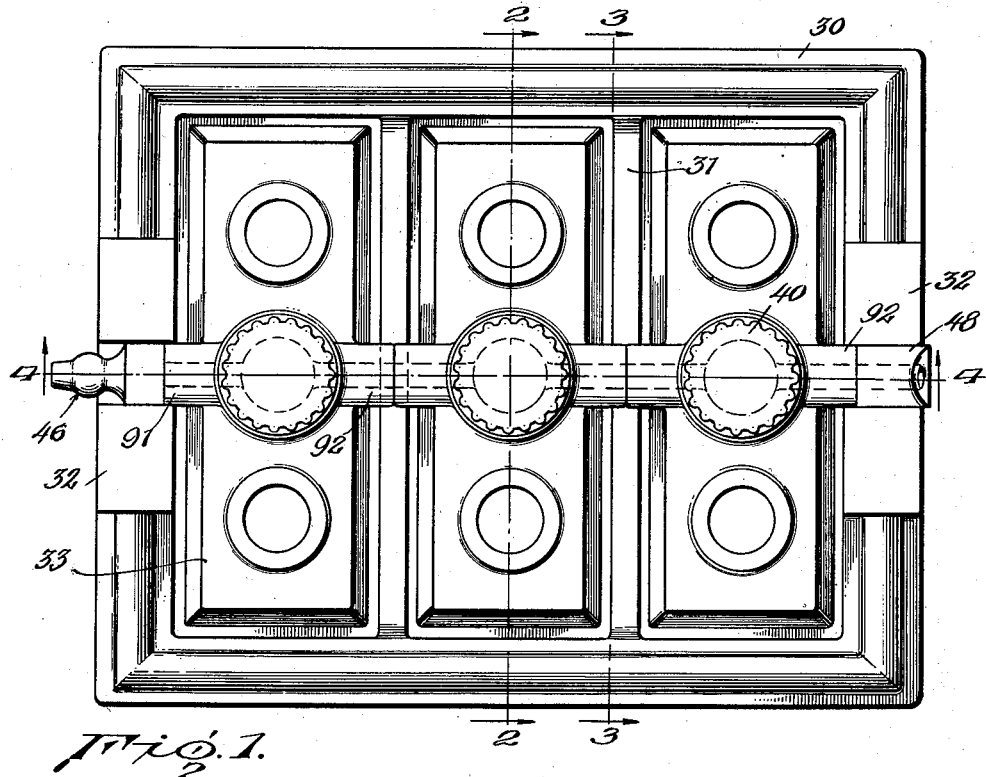
Fig. 1 is a plan view of a more or less conventional three-cell storage battery having associated with it my improved type filling device.

In general, I accomplish the objects of my invention by providing for each of the several cells of a storage battery a filling device which includes a filler passage discharging into the cell and connected near its opposite end to an inlet duct through which the distilled water or other liquid may be discharged into the filler passage and thence into the cell. I also provide for each filling device an outlet or overflow duct which also communicates with said filler passage so that when the liquid backs up in said filler passage it will flow out through said overflow duct. The disposition of the inlet duct and the outlet duct of each filler passage is preferably such that no liquid will flow from the former directly into the latter until it shall have backed up in the filler passage to the overflow level. In order to shut off discharge of liquid into the cell through the filling device when the electrolyte in the cell reaches a predetermined level, I provide in each filler passage an air vent tube or passage and so locate the inner end of said vent tube as to admit of its being sealed by the electrolyte when the latter reaches said predetermined level, thus entrapping air in the cell above the electrolyte, the pressure of which prevents further discharge of any substantial amount of liquid into the cell until the level of the electrolyte has dropped sufficiently to unseal the inner end of said vent. The vent tube, therefore, as in the previously patented structures, acts like a valve. It automatically shuts off the discharge of liquid into the cell when the electrolyte reaches the proper level. When the filling devices are arranged in series, as, for instance, in a multiple cell battery such as herein shown, the outlet or overflow duct of the first filling device of a given series constitutes the inlet duct of the next adjacent or second filling device of the same series. Hence, for a three-cell battery there is provided one inlet duct, two combined inlet and overflow ducts, and one outlet duct. For each additional cell of any given series, an additional combined inlet and overflow duct is added to complete the filler circuit.

Referring first to Figs. 16 to 19, inclusive, wherein I have illustrated what I now consider the preferred embodiment of the invention, a three-cell storage battery is shown. The battery box or casing is designated as 30. The partitions within the box which separate the cells are designated as 31. Neither the plates nor the electrolyte within which the plates are immersed is shown in the drawings. Handles 32 are formed at the ends of the box.

Each cell is provided with a suitable cover 33. The covers 33 are of special design and have formed therein or fastened thereto the parts or portions which go to make up the filling devices. The filling devices are shown as connected in series. They extend lengthwise the battery box across the battery top and are built in for the major part within the cell covers.

The covers 33 are identical in design. Each has formed centrally thereon an enlargement 34, the exterior wall of which is angled as at 35 and indented as at 36. On its under side each enlargement 34 is recessed as at 37 and there is formed in each enlargement a vertical passage 38. The passages 38, hereinafter called filler passages, are in open communication with the cells of the battery, openings 39, discharging into the recesses 37, being provided for this purpose.

Removable caps 40 are fitted over the outer ends of the filler passages 38. Said caps are shown as exteriorly threaded and are adapted to be screwed into the filler passages. Preferably (see Fig. 16) the filler passages are enlarged and interiorly threaded to accommodate the threaded caps.

On the under side of each cap 40 there is formed an integral vent tube 41. Each vent tube at its inner end snugly fits an opening 42 formed in the inner end wall 43 of its associated filler passage. Liquid entering the filler passages is thus prevented from flowing into the battery cells through said openings 42, and is made to flow instead into said cells by way of the openings 39. That the vent tubes 41 may be sealed by the electrolyte when the electrolyte reaches a predetermined level, said tubes at their inner ends, terminate at said level. A vent opening 44 is formed in the wall of each tube at or near its upper end.

Rubber cement or sealing compound 45 is used to seal and hold the covers 33 in place. It is also used to seal and hold in place (a) a filler fitting 46, (b) one or more (depending upon the number of the battery cells required to be serviced) connector fittings 47, and (c) a discharge fitting 48. The filler fitting 46 of Figs. 16 and 17 is an angled fitting seated in a recess 49 formed in one of the battery box handles. It has formed therein a duct or passage 50 and is provided at one end with an upstanding nipple 51 over which a filler hose (not shown) is adapted to be fitted. At its opposite end it fits snugly within one of the indentations 36 formed in the side wall of the enlargement 34 constituting the first of the series of filling devices. From the duct or passage 50 liquid is fed to the filler passage 38 of said first enlargement through an inlet duct 52 formed in the enlargement wall. To keep dust and dirt from entering the filler passage an overhanging lip or projection 53 is formed on the fitting 46. Said fitting is also provided with a base flange 54 which is adapted to interlock with a groove or recess formed in the outer wall of the enlargement. Thus interlocked, as it were, the sealing compound is prevented from leaking into the filler passage even should the fit between the fitting and the enlargement be imperfect. The size of the filler duct, as compared to the overflow duct later to be described, is relatively small.

The multiple battery cells, as previously stated, are adapted to be properly filled or serviced in series, i. e., first one, then another, and so on until the total number of cells has been properly filled. To this end each enlargement 34 has formed therein an overflow or outlet duct 55. The outlet duct of the first of said series is in open communication with the inlet duct of the second of said series, and the outlet duct of the second of said series is in open communication with the inlet duct of the third, etc. The purpose of the connector fittings 47 is to admit of such open communication. Said fittings, it will be noted, span the partitions 31 which divide the battery cells, and are provided, each, with a duct or passage 56 through which the liquid flows. They are also provided, at each end, and for the same reason as the fitting 46, with a base flange 57 and an overhanging lip or projection 58. The partitions 31, where said fittings cross, are notched as at 59 to accommodate said fittings.

The discharge fitting 48 is similar to the fitting 46 and is seated in a recess 59 formed in the opposite end handle of the battery box. It is provided with a large diameter duct or passage 60 and with a nipple 61. The nipple, however, instead of extending vertically, is disposed horizontally, so as to spill the liquid over the edge of the box or casing 30. Like said fitting 46, the fitting 48 is also provided with a base flange 62, at its inner end for a like or similar purpose and with an overhanging lip or projection 63. The necessity for a large diameter overflow duct and a smaller diameter inlet duct is to prevent overflow of the electrolyte should the sealing compound crack. Under no circumstances should the distilled water or other liquid be supplied to the battery faster than the overflow duct can carry it off.

In Figs. 20 and 21 a generally similar structure is disclosed. The cell cover 64 is enlarged as at 65. Said enlargement is provided with a filler passage 66, a filler duct 67, and an overflow duct 68. On its under side the cover or enlargement is recessed as at 69. No removable cap, however, is provided. A one-piece structure is used instead. From the top wall of the enlargement an integral vent tube 70 depends into the filler passage. This tube, instead of having a vent opening near its top, is provided with vent slots 71 carried throughout its length at right angles to the ducts 67 and 68. In all other respects, the devices of Figs. 16 and 17 and the device of Figs. 20 and 21 are identical. Suffice it to say that the latter device is cheaper to manufacture. It lacks, however, a removable cap, which by many is considered desirable, in that the battery may be tested or serviced in the ordinary way.

The structure of Figs. 6 to 10, inclusive, will next be described. In this suggested embodiment, the connector fittings 47 of Figs. 16 to 18, inclusive, are dispensed with. The battery box partitions, designated as 72, extend upwardly to a higher level. Each said partition near its upper edge is provided with an opening 73. Said openings are adapted to register or coincide with the overflow and inlet ducts 74 and 75, respectively, of adjacent filling devices. The covers 76 of the battery cells are alike in construction. The enlargements 77, however, instead of being indented at diametrically opposite points, are laterally extended as at 78—79, and it is within said extensions 78—79 that the inlet ducts 74 and the outlet ducts 75 are respectively formed. Said extensions abut the partitions and the relative arrangement is such that the passages formed therein register with the openings 73. A liquid-tight seal at the joint is insured through the provision of space 80 beneath the extensions which is adapted to be filled with sealing compound. As in Figs. 16 to 19, inclusive, an inlet fitting 81 and an outlet fitting 82 are provided. The nipple 83 of the inlet fitting is here shown horizontally extended, though otherwise the same, whereas the outlet fitting is of an entirely different construction. Both are anchored to the battery box in notches 84 formed in the battery box handles. Except as noted, the reference characters of Figs. 16 to 19, inclusive, are applicable to Figs. 6 to 10, inclusive.

The filling device of Fig. 11 is in the nature of a compromise. It embodies certain structural features disclosed in Figs. 20 and 21 as well as other structural features characteristic of Figs. 6 to 10, inclusive. The principal difference resides in the construction of the vent. Instead of a vent tube integral with the cover, a detachable or separately formed vent tube 85 is shown. Said tube 85 extends upwardly from the under side of the cover and is provided with a spaced concentric threaded shank 86 adapted to be threaded within the filler passage from beneath. Between said tube and the concentric shank, openings 87 corresponding to the openings 39 of Figs. 16 to 19, inclusive, are formed. At its upper or inner end the vent tube 85 bears firmly against the closed upper end of the filler passage and has formed adjacent to its upper end a vent opening 88. Here, also, unless specifically identified, like reference characters denote like or corresponding parts.

Fig. 12 discloses a filling device reduced to its simplest possible form. Said device is provided with the lateral extensions 78—79 of Figs. 6 to 10, inclusive, but is in other respects generally similar to the device of Figs. 20 and 21. Instead, however, of vent slots such as are shown in the latter figures, a vent opening 89 is provided at the inner or upper end of the vent tube 90.

Figure 2:
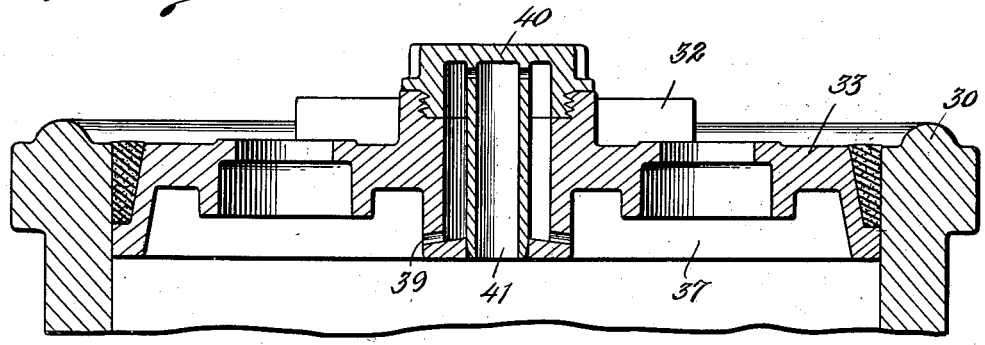
Fig. 2 is an enlarged section on the line 2—2 of Fig. 1.
Figure 3:
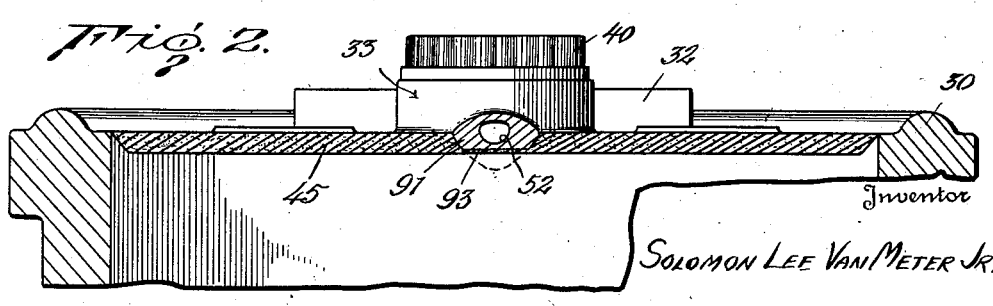
Fig. 3 is a similar view on the line 3—3 of Fig. 1.

Referring next to Figs. 1 to 5, inclusive, a still further modification is shown. Insofar as the cap, the filler passage, the vent tube, and certain other parts are concerned, the structure of Figs. 1 to 5, inclusive, is the same as the structure of Figs. 16 to 19, inclusive. It is also generally similar to the structure of Figs. 6 to 10, inclusive. As in said last mentioned figures, lateral extensions 91—92, corresponding to the lateral extensions 78—79 are provided. Said extensions 91—92 are longer, however, and instead of bearing at their ends against the battery box partitions, they bear (as shown) end to end one against the other or against the end fittings as the case may be. At their outer ends said extensions 91—92 are flattened as at 93 on their under side to overhang the partitions, a space being provided beneath said overhanging portions to admit of the sealing compound entering said space. The sealing compound, be it noted, with the cell covers sealed, is brought to the level of the top of the battery box. The box partitions, however, instead of rising to the level of the top of the box, are carried beneath the extension overhangs. Here, again, where applicable, like reference characters denote like or corresponding parts.

In the modifications of Figs. 13 to 15, inclusive, another form of filler or inlet fitting is shown. Said fitting, designated as 94 is seated in a recess formed in the battery box handle and is provided with extensions 95. These extensions project laterally out from said fitting and serve to anchor the fitting in place. The duct 96 of said fitting is open to the inlet duct of its associated fitting device. In other respects, the fitting 94 is generally similar to the fitting 46.

The advantages of a filling device such as that herein described are that it can be manufactured, in quantity, at low cost; and, due to the fact that it is built in, as it were, leakage, should the sealing compound crack, is avoided. In each of the filling devices herein described, the device parts within which the inlet and overflow ducts are formed are embedded in the sealing compound itself.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a multiple cell storage battery, a cover for each cell, said covers being shaped to provide between adjacent covers space for a sealing compound, and ducts extending between adjacent covers and across said space, said ducts, being embedded, partially at least, within said sealing compound.

2. In a multiple cell storage battery, a cover for each cell, said covers being provided each with a raised center portion to provide between adjacent covers space for a sealing compound, and ducts extending between adjacent cover portions and across said space, said ducts being embedded, partially at least, within said sealing compound.

3. In a multiple cell storage battery, a cover for each cell, said covers being shaped to provide between adjacent covers space for a sealing compound, and ducts extending between adjacent covers and across said space, said ducts being embedded within said sealing compound and said sealing compound being substantially flush with the tops of the respective covers.

4. In a multiple cell storage battery, a battery box within which the battery cells are encased, a cover for each cell, said covers being shaped to provide between adjacent covers space for a sealing compound, partitions between adjacent cells rising into said space, and ducts extending between adjacent covers and across said space, said ducts and the top edges of said partitions being embedded in said sealing compound.

5. In a multiple cell storage battery, a battery box within which the battery cells are encased, a cover for each cell, said covers being shaped to provide between adjacent covers space for a sealing compound, partitions between adjacent cells rising into said space, and ducts extending between adjacent covers and spanning said partitions, said ducts and the top edges of said partitions being embedded in said sealing compound.

6. In a multiple cell storage battery, a cover for each cell, said covers being provided each with a raised center portion and with side wall indentations, space for a sealing compound being provided between adjacent covers, and ducts extending from cover to cover across said space, said ducts being embedded for the major part within said sealing compound and having ends adapted to interfit within said indentations.

7. In a storage battery, a cell, a box within which said cell is encased, a cover for said cell shaped to provide between it and the end wall of said box space for a sealing compound, a duct formed in said cover, and a fitting carried by said box and extended across said space, said fitting being partially embedded within said sealing compound and having formed therein a passage open to said duct.

8. In a storage battery, a cell, a box within which said cell is encased, said box having formed in one end wall thereof a recess, a cover for said cell shaped to provide between it and the end wall of said box space for a sealing compound, a duct formed in said cover, and a fitting seated in said recess and extended at one end across said space, said fitting being partially embedded in said sealing compound and having formed therein a passage open to said duct.

9. In a storage battery, a cell, a box within which said cell is encased, a cover for said cell, said cover having formed thereon a raised center portion and a side wall indentation, a duct formed in the side wall of said cover, and a fitting carried by said box adapted to snugly fit at one end in said indentation, said fitting having formed therein a passage open to said duct.

10. In a storage battery, a cell, a box within which said cell is encased, a cover for said cell, said cover having formed thereon a raised center portion to provide between it and one end of said box space for a sealing compound, an integral extension formed on the side wall of said raised center portion adapted to extend laterally across said space, said extension having formed therein a duct, and a fitting carried by said box adapted to bear at one end on said extension, said fitting having formed therein a passage open to said duct and said extension being partially embedded in the sealing compound within said space.

11. In a multiple cell storage battery, a cover for each cell, said covers being provided each with a raised center portion to provide between adjacent covers space for a sealing compound, and an integral side wall extension formed on each raised cover portion, said extensions being provided each with a duct and said ducts being in open communication one with the other to bridge said space, the extensions, for the major part, being embedded in said sealing compound.

12. In a multiple cell storage battery, a battery box within which the battery cells are encased, a partition between adjacent cells, each said partition having formed therein an opening, a cover for each cell, said covers being shaped to provide between adjacent covers space for a sealing compound into which the dividing partition is adapted to extend, and a side wall extension formed on each said cover, the extensions formed on adjacent covers being adapted to span said space and to bear endwise against said partition, said extensions being partially embedded in said sealing compound and being each provided with a duct adapted to register with said partition opening.

13. In a storage battery, a cell, a box within which said cell is encased, said box having formed in one end wall thereof a recess, a cover for said cell having a raised center portion provided with a side wall indentation, a duct formed within said cover, and a fitting seated in said recess and extended laterally to interfit within said indentation, said fitting having formed therein a passage open to said duct.

14. In a storage battery, a cell, a cover for said cell, said cover having formed thereon a raised center portion and a side wall indentation, a duct formed in the side wall of said cover, and a fitting adapted to snugly fit at one end in said indentation, said fitting having formed therein a passage open to said duct.

15. In a storage battery, a cell, a cover for said cell, said cover having formed therein an indentation, a duct formed in said cover, and a fitting adapted to fit at one end within said indentation, said fitting having formed therein a passage open to said duct.

SOLOMON L. VAN METER, Jr.